US012752480B2

(12) United States Patent
Nakamura et al.

(10) Patent No.: US 12,752,480 B2
(45) Date of Patent: Oct. 6, 2026

(54) METHOD OF MANUFACTURING 3-DIMENSIONAL MODEL OBJECT USING RESIN GRANULAR MATERIAL

(71) Applicant: Toray Industries, Inc., Tokyo (JP)

(72) Inventors: Tomohiko Nakamura, Nagoya (JP); Hirokazu Iwata, Nagoya (JP); Yota Okuno, Otsu (JP); Itaru Asano, Nagoya (JP)

(73) Assignee: Toray Industries, Inc., Tokyo (JP)

(*) Notice: Subject to any disclaimer, the term of this patent is extended or adjusted under 35 U.S.C. 154(b) by 195 days.

(21) Appl. No.: 18/278,267

(22) PCT Filed: Feb. 22, 2022

(86) PCT No.: PCT/JP2022/007369
§ 371 (c)(1),
(2) Date: Aug. 22, 2023

(87) PCT Pub. No.: WO2022/181634
PCT Pub. Date: Sep. 1, 2022

(65) Prior Publication Data

US 2024/0140026 A1 May 2, 2024

(30) Foreign Application Priority Data

Feb. 25, 2021 (JP) ................................ 2021-028424
Oct. 19, 2021 (JP) ................................ 2021-171167

(51) Int. Cl.
*B29C 64/153* (2017.01)
*B33Y 80/00* (2015.01)

(52) U.S. Cl.
CPC .... *B29C 64/153* (2017.08); *B29K 2995/0094* (2013.01); *B33Y 80/00* (2014.12)

(58) Field of Classification Search
CPC .................................................... B29C 64/153
See application file for complete search history.

(56) References Cited

U.S. PATENT DOCUMENTS 7,211,615 B2 * 5/2007 Baumann ............... B33Y 70/10 427/508
8,883,110 B2 * 11/2014 Ueda ..................... C01B 33/158 264/80

(Continued)

FOREIGN PATENT DOCUMENTS

JP 4878102 B2 2/2012
JP 2017-109492 A 6/2017

(Continued)

OTHER PUBLICATIONS

Snyder et al., Understanding Laser Powder Bed Fusion Surface Roughness, Journal of Manufacturing Science and Engineering, Jul. 2020, vol. 142 071003 (Year: 2020).*

(Continued)

*Primary Examiner* — Xiao S Zhao
*Assistant Examiner* — Nicholas J Chidiac
(74) *Attorney, Agent, or Firm* — DLA Piper LLP (US)

(57) ABSTRACT

A method of manufacturing a 3-dimensional model object by a powder bed fusion method using a resin granular material, in which the resin granular material comprises a resin powder (A) and a flow aid (B), a sphericity of the resin powder (A) is 80 or more and 100 or less, the resin powder (A) has a D80 particle size of 60 μm or less and a D20 particle size of 1 μm or more, the flow aid (B) is contained at an amount of more than 0.01 part by mass and less than 5 parts by mass with respect to 100 parts by mass of the resin powder (A), and steps (a) to (c) are performed in this order repeatedly.

9 Claims, 2 Drawing Sheets

(56) References Cited

U.S. PATENT DOCUMENTS 9,120,678 B2 * 9/2015 Ueda .................... C01B 33/14
9,272,918 B2 * 3/2016 Ueda .................... C01B 33/181
9,428,610 B2 * 8/2016 Diekmann .............. B29C 67/04
9,446,959 B2 * 9/2016 Ueda .................... C01B 33/183
10,023,488 B2 * 7/2018 Ueda .................... C03B 19/1095
10,479,733 B2 * 11/2019 Diekmann .............. B22F 1/102
10,596,728 B2 3/2020 Diekmann et al.
11,001,046 B2 * 5/2021 Watanabe ............ C09D 11/037
11,241,825 B2 * 2/2022 Sun .................... B33Y 40/00
11,491,713 B2 * 11/2022 Saito .................... C08G 69/26
11,639,053 B2 * 5/2023 Veregin .................. B29B 9/16
264/497
11,643,566 B2 * 5/2023 Hu .................... C23C 18/1641
264/497
11,787,944 B2 * 10/2023 Sriskandha .......... C09D 183/04
523/204
12,595,184 B2 * 4/2026 Yamada ................ B33Y 10/00
12,600,643 B2 * 4/2026 Yamada ................ B33Y 10/00
2004/0204531 A1 * 10/2004 Baumann ............ C09D 177/02
524/492
2012/0288716 A1 * 11/2012 Ueda .................... C01B 33/157
428/406
2012/0299207 A1 * 11/2012 Ueda .................... C01B 33/158
264/15
2012/0321894 A1 * 12/2012 Ueda .................... C01B 33/181
65/17.2
2012/0321895 A1 * 12/2012 Ueda .................... C03C 23/0075
65/17.2
2013/0011660 A1 * 1/2013 Diekmann .............. B22F 1/102
428/407
2013/0171416 A1 * 7/2013 Diekmann .............. C08K 9/08
428/407
2014/0065423 A1 * 3/2014 Ueda .................... C01B 33/1415
65/17.2
2015/0321939 A1 * 11/2015 Ueda .................... C03B 19/1095
65/17.2
2018/0022024 A1 * 1/2018 Saito .................... B29B 9/16
264/482
2019/0375149 A1 * 12/2019 Limem ................ B29C 64/118
2020/0040204 A1 * 2/2020 Watanabe ............ B29C 64/153
2020/0048413 A1 2/2020 Asano
2020/0070412 A1 * 3/2020 Sun .................... C08G 69/00
2020/0307027 A1 * 10/2020 Veregin ................ B33Y 70/00
2021/0071020 A1 * 3/2021 Hu .................... C23C 18/40
2022/0162446 A1 * 5/2022 Sriskandha .......... C09D 183/04
2022/0403206 A1 * 12/2022 Brule .................... C08L 71/12
2023/0227680 A1 * 7/2023 Hu .................... C09D 11/38
264/497
2024/0001447 A1 * 1/2024 McMurtry ............ B22F 10/32
2025/0162898 A1 * 5/2025 Yamada ................ B33Y 10/00
2025/0162948 A1 * 5/2025 Yamada ................ B33Y 10/00

FOREIGN PATENT DOCUMENTS

JP 2018-196983 A 12/2018
WO 2018/207728 A1 11/2018

OTHER PUBLICATIONS

International Search Report dated Mar. 29, 2022 in counterpart International Application No. PCT/JP2022/007369 w/English translation.

Written Opinion dated Mar. 29, 2022 in counterpart International Application No. PCT/JP2022?007369.

* cited by examiner

METHOD OF MANUFACTURING 3-DIMENSIONAL MODEL OBJECT USING RESIN GRANULAR MATERIAL

TECHNICAL FIELD

This disclosure relates to a method of manufacturing a 3-dimensional model object using a resin granular material, a 3-dimensional model object obtained thereby, and a resin granular material.

BACKGROUND

A powder bed fusion method is known as a technology of manufacturing a 3-dimensional model object (hereinafter, a model object). A model object created by the powder bed fusion method is manufactured by sequentially repeating a thin layer forming process of spreading powder into a thin layer, and a cross-sectional shape forming step of melting the formed thin layer selectively into a shape corresponding to a cross-sectional shape of an object to be modeled and joining resin granular material. As the methods of selectively melting the powder, there are a selective laser sintering method using a laser, a selective absorption sintering method using a melting aid, a selectively inhibited sintering method masking an area not to be melted. In such a method, a model object with a smooth surface can be obtained as compared with other modeling methods. Further, there is an advantage such as no need for a support member. Furthermore, in recent years, due to the increasing demand for model objects with complex shapes and outlines that could not be achieved by conventional processing methods, it is important to obtain a model object with a smooth surface without an irregularity.

For such a requirement, in JP-B-4878102, disclosed is a method of manufacturing a model object with a smooth surface by using, as a resin powder, a polyamide powder with a D50 particle size of 98 μm and containing many irregularly shaped particles, and hydrophobized silicic acid which is a flow aid. Further, in JP-A-2017-109492, disclosed is a method of manufacturing a model object with a smooth surface by using a polyamide powder having a D50 particle size of 40 to 70 μm.

However, in JP '102, although a model object with reduced surface defects can be manufactured by using a resin granular material having an excellent flowability, the shape of the polyamide powder is irregular and it is insufficient to obtain a model object with a small surface roughness. Further, in JP '492, although a polyamide powder with an excellent sintering property is used, because coarse powder is contained and the height for layering the resin granular material during 3D modeling (layering height) is 0.15 mm which is large, the surface roughness in the height plane direction in 3D modeling (indicates X and Y directions in the plane direction in which the resin granular material is layered, and may be referred to as the X direction and Y direction) and the surface roughness in the height direction in which the resin granular material is layered (also the Z direction) increase, and there is a problem that the surface smoothness (quality) deteriorates.

Accordingly, in 3-dimensional modeling, it could be helpful to provide a method of manufacturing a model object in which the surface roughness in the X and Y directions in the plane direction in which the resin granular material is layered and the surface roughness in the Z direction which is the height direction in which the resin granular material is layered are small.

SUMMARY

We thus provide:

(1) A method of manufacturing a 3-dimensional model object by a powder bed fusion method using a resin granular material, characterized in that the resin granular material comprises a resin powder (A) and a flow aid (B), a sphericity of the resin powder (A) is 80 or more and 100 or less, the resin powder (A) has a D80 particle size of 60 μm or less and a D20 particle size of 1 μm or more, the flow aid (B) is contained at an amount of more than 0.01 part by mass and less than 5 parts by mass with respect to 100 parts by mass of the resin powder (A), and the following steps (a) to (c) are performed in this order repeatedly.

(a) A stage of a vessel for forming the 3-dimensional model object is lowered by an amount in a range of 0.01 mm or more and less than 0.10 mm.

(b) The resin granular material is supplied to the vessel for forming the 3-dimensional model object to layer the resin granular material.

(c) A thermal energy is imparted to the resin granular material to selectively melt and sinter the resin granular material.

(2) The method of manufacturing a 3-dimensional model object according to (1), wherein a D50 particle size of the resin powder (A) is 1 μm or more and 50 μm or less.

(3) The method of manufacturing a 3-dimensional model object according to (1) or (2), wherein the resin granular material contains 10 parts by mass or more and 200 parts by mass or less of an inorganic reinforcing material (C) with respect to 100 parts by mass of the resin powder (A).

(4) The method of manufacturing a 3-dimensional model object according to any one of (1) to (3), wherein the thermal energy is a laser energy, and the laser energy is 0.2 J/cm$^2$ or more and less than 2.0 J/cm$^2$ per unit area imparted to the resin granular material.

(5) The method of manufacturing a 3-dimensional model object according to any one of (1) to (4), wherein a surface roughness of a 3-dimensional model object to be obtained in a plane direction in which the resin granular material is layered is 20 μm or less, and a surface roughness of the model object in a height direction in which the resin granular material is layered is 20 μm or less.

(6) A 3-dimensional model object formed by a powder bed fusion method using a resin granular material, characterized in that a surface roughness of the model object in a plane direction in which the resin granular material is layered is 20 μm or less, and a surface roughness of the model object in a height direction in which the resin granular material is layered is 20 μm or less.

(7) The 3-dimensional model object according to (6), wherein an average spherical equivalent size of pores in the 3-dimensional model object observed by X-ray CT measurement is 1 μm or more and 100 μm or less.

(8) A resin granular material for manufacturing a 3-dimensional model object by a powder bed fusion method, characterized in that the resin granular material comprises a resin powder (A) and a flow aid (B), a sphericity of the resin powder (A) is 80 or more and 100 or less, the resin powder (A) has a D80 particle size of 60 μm or less and a D20 particle size of 1 μm or more, and the flow aid (B) is contained at an amount of more than 0.01 part by mass and less than 5 parts by mass with respect to 100 parts by mass of the resin powder (A).

(9) The resin granular material according to (8), wherein a D50 particle size of the resin powder (A) is 1 μm or more and 50 μm or less.

(10) The resin granular material according to (8) or (9), wherein a D50 particle size of the flow aid (B) is 20 nm or more and to 1 μm or less.

(11) The resin granular material according to any one of (8) to (10), wherein, when a D50 particle size of the resin powder (A) is referred to as D50(A), a D50 particle size of the flow aid (B) is referred to as D50(B), and a content of the flow aid (B) with respect to 100 parts by mass of the resin powder (A) is referred to as X parts by mass, D50(A)×X/D50(B) is more than 30 and less than 300.

(12) The resin granular material according to any one of (8) to (11), wherein an inorganic reinforcing material (C) is contained at an amount of 10 parts by mass or more and 200 parts by mass or less with respect to 100 parts by mass of the resin powder (A).

Accordingly, in a 3-dimensional modeling, a model object in which the surface roughness in the X and Y directions in the plane direction in which the resin granular material is layered and the surface roughness in the Z direction which is the height direction in which the resin granular material is layered are small can be obtained.

EXPLANATION OF SYMBOLS

Figure 1:
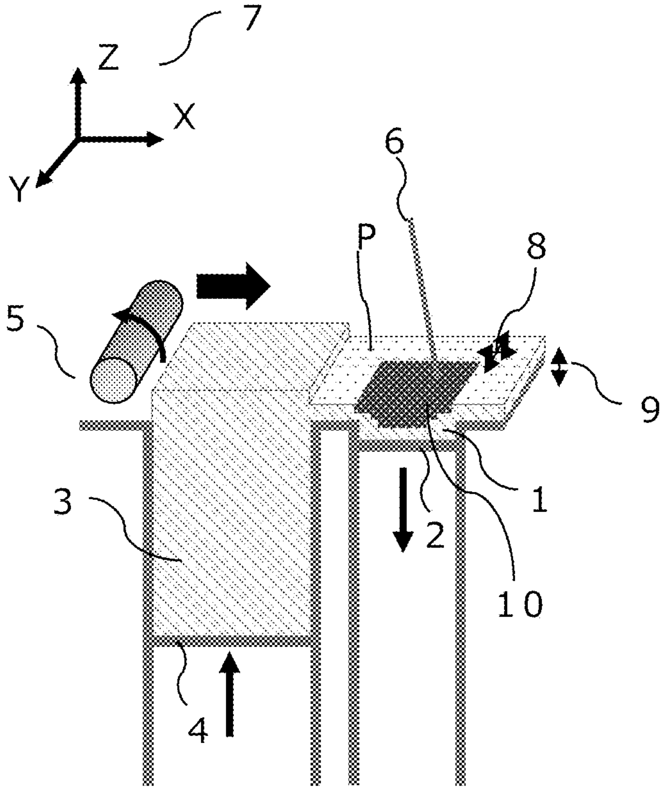
FIG. 1 is a schematic diagram showing an example of a device for manufacturing 3-dimensional model object.

1: vessel for forming model object
2: stage of vessel for forming model object
3: supply vessel filled in advance with resin granular material being supplied
4: stage of vessel filled in advance with resin granular material being supplied
5: recoater
6: thermal energy
7: X, Y, Z coordinate system
8: plane direction in which resin granular material is layered
9: height direction in which resin granular material is layered
10: 3-dimensional model object
11: surface of model object in plane direction in which resin granular material is layered
12: surface of model object in height direction in which resin granular material is layered
P: resin granular material

DETAILED DESCRIPTION

Hereinafter, our methods, resin granular material and model objects will be explained in detail together with examples.

When manufacturing a 3-dimensional model object, conventionally, if the layering height of a resin granular material is set low, because the modeling speed is slowed down, a stage of a vessel has been lowered at an amount of 0.10 mm or more and, therefore, it has not been possible to manufacture a model object with a surface roughness in the Z direction of 20 μm or less.

Unless the layering height at the time of a 3-dimensional modeling is set to a value exceeding the maximum particle size contained in the resin powder, the model object becomes inferior in surface roughness in the X and Y directions. Further, resin powders with a small particle size has not been able to be applied to a 3-dimensional modeling because of insufficient flowability due to a high contact resistance between resin powders. However, even when the particle size of the resin granular material is small, we found that, under certain conditions, surprisingly it is possible to ensure a flowability applicable to 3-dimensional modeling, and in 3-dimensional modeling, to provide a model object in which the surface roughness in the X and Y directions in the plane direction in which the resin granular material is layered and the surface roughness in the Z direction which is the height direction in which the resin granular material is layered are small.

Namely, our method of manufacturing a 3-dimensional model object is a method of manufacturing a 3-dimensional model object by the powder bed fusion method using a resin granular material, characterized in that the resin granular material comprises a resin powder (A) and a flow aid (B), a sphericity of the resin powder (A) is 80 or more and 100 or less, the resin powder (A) has a D80 particle size of 60 μm or less and a D20 particle size of 1 μm or more, the flow aid (B) is contained at an amount of more than 0.01 part by mass and less than 5 parts by mass with respect to 100 parts by mass of the resin powder (A), and steps (a) to (c) are repeatedly performed in this order:

(a) a stage of a vessel for forming the 3-dimensional model object is lowered by an amount of 0.01 mm or more and less than 0.10 mm, (b) the resin granular material is supplied to the vessel used to form the 3-dimensional model object to layer the resin granular material, and (c) a thermal energy is imparted to the resin granular material to selectively melt and sinter the resin granular material.

Herein after, each step of the manufacturing method of the 3-dimensional model object will be explained with reference to FIG. 1.

In step (a), a stage 2 of a vessel 1 forming a model object is lowered to 0.01 mm or more and less than 0.10 mm. By setting such a range, a space which can be filled with a resin granular material P is formed.

In step (b), a stage 4 of a vessel 3 (also a supply vessel) filled in advance with the resin granular material P to be supplied to the vessel 1 forming the model object is raised by an amount of a height capable of supplying the resin granular material P to the vessel 1 by an amount sufficient to fill the resin granular material P into the vessel 1 by an amount corresponding to a predetermined layering height formed in the vessel 1. Then, a recoater 5 is moved from the left end of the supply vessel 3 to the right end of the vessel 1 to layer the resin granular material P in the vessel 1. The direction parallel to the movement of the recoater 5 is an X direction, and the direction perpendicular to the movement direction of the recoater 5 on the powder surface of the resin granular material P is a Y direction. Symbol 7 indicates a coordinate system representing the X, Y and Z directions.

Symbol 8 indicates the plane direction in which the resin granular material is layered, and symbol 9 indicates the height direction in which the resin granular material is layered.

In step (c), the resin granular material P filled in the vessel 1 by a predetermined layering height in step (b) is imparted with a thermal energy 6 capable of being melted, and selectively melted and sintered according to a modeling data.

Figure 2:
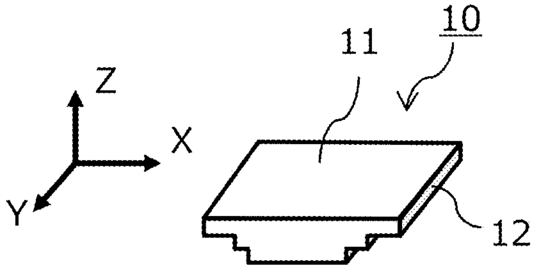
FIG. 2 is a schematic diagram showing an example of a 3-dimensional model object.

By repeating the above-described steps (a) to (c), a 3-dimensional model object 10 (also shown in FIG. 2) is obtained. In FIG. 2, symbol 11 indicates the surface of the model object in the plane direction in which the resin granular material is layered, and symbol 12 indicates the surface of the model object in the height direction in which the resin granular material is layered, respectively.

The layering height is 0.01 mm or more and less than 0.10 mm. When less than 0.01 mm, an unevenness occurs on the layered surface, resulting a model object having a large surface roughness in the X and Y directions. When 0.10 mm or more, a layered step is generated in the layering height direction of the resin granular material, resulting a model object having a large surface roughness in the Z direction. It is preferably 0.02 mm or more, more preferably 0.03 mm or more, and further preferably 0.04 mm or more, from the viewpoint of widening the allowable range of the maximum particle size contained in the resin powder. It is preferably less than 0.09 mm, more preferably less than 0.08 mm, further preferably less than 0.07 mm, and particularly preferably less than 0.06 mm, from the viewpoint capable of reducing the surface roughness in the Z direction.

In step (b), the height of the stage 4 of the supply vessel to be raised is preferably 0.03 mm or more, more preferably 0.04 mm or more, further preferably 0.05 mm or more, and particularly preferably 0.06 mm or more, from the viewpoint of the height at which a sufficient amount of resin granular material can be supplied to fill the space formed in the vessel 1 in step (a). Further, if an excessive amount of the resin granular material is supplied, the resin granular material prepared in the vessel 3 is excessively consumed so it is preferably 0.15 mm or less, more preferably 0.13 mm or less, further preferably 0.11 mm or less, and particularly preferably 0.10 mm or less.

Further, the speed at which the recoater 5 is moved in step (b) is preferably a speed at which a uniform granular surface of the resin granular material can be formed in the vessel 1. The upper limit of such a speed is preferably 1.00 m/s or less, more preferably 0.70 m/s or less, further preferably 0.50 m/s or less, and particularly preferably 0.30 m/s or less. If the moving speed of the recoater is slow, the modeling speed is lowered, which leads to the productivity of the 3-dimensional model object so the lower limit thereof is preferably 0.01 m/s or more, is more preferably 0.02 m/s or more, further preferably 0.03 m/s or more, and particularly preferably 0.05 m/s or more.

As the method of selectively melting and sintering in step (c), for example, a selective laser sintering method of irradiating a laser to a shape corresponding to the cross-sectional shape of the model object to join the resin granular materials or the like can be exemplified. In addition, a selective absorption (or suppression) sintering method comprising a printing step of printing an energy absorption accelerator or an energy absorption inhibitor in a shape corresponding to the cross-sectional shape of the object to be modeled and a step of joining the resin powder using an electromagnetic radiation or the like can be also exemplified.

The laser beam used in the selective laser sintering method is not particularly limited as long as it does not impair the quality of the resin granular material or model object. For example, exemplified are a carbon dioxide laser, a YAG laser, an excimer laser, a He—Cd laser, a semiconductor excitation solid-state laser and the like. Among these, the carbon dioxide laser is preferred because it is simple to operate and easy to control.

In step (c), to the resin granular material filled in the vessel 1 in step (b) at a predetermined layering height, a thermal energy capable of melting it is imparted. For example, the energy imparted to the resin granular material by the laser can be evaluated by the laser energy Ea per unit area. Ea is calculated from a laser output, a laser scanning speed and a laser scanning interval determined by the following equation:

$$Ea=Q/(vw).$$

In the equation, indicated are Q: laser output, v: laser scanning speed, w: laser scanning interval, Ea: laser energy per unit area.

If the value of Ea is small, the resin powder tends not to be sufficiently sintered, and the strength of the model object may decrease. Therefore, it is preferably 0.2 J/cm$^2$ or more, more preferably 0.3 J/cm$^2$ or more, further preferably 0.4 J/cm$^2$ or more, and particularly preferably 0.5 J/cm$^2$ or more. On the other hand, if the value of Ea is too large, the laser energy may be imparted by an amount of more than the layering height, and the model object may swell downward. Therefore, it is preferably less than 2.0 J/cm$^2$, more preferably less than 1.8 J/cm$^2$, further preferably less than 1.6 J/cm$^2$, and particularly preferably less than 1.5 J/cm$^2$.

Further, any electromagnetic radiation that does not impair the quality of the resin granular material or model object can be used for the selective absorption (suppression) sintering, but an infrared is preferred because an energy relatively inexpensive and suitable for modeling can be obtained. Further, the electromagnetic radiation may or may not be coherent.

The energy absorption accelerator is a substance that absorbs an electromagnetic radiation. As such a substance, exemplified are carbon black, carbon fiber, copper hydroxy phosphate, near-infrared absorbing dyes, near-infrared absorbing pigments, metal nanoparticles, polythiophenes, poly(p-phenylene sulfide), polyaniline, poly(pyrrole), polyacetylene, poly(p-phenylene vinylene), polyparaphenylene, poly(styrene sulfonate), poly(3,4-ethylenedioxy thiophene)-poly(styrene phosphonate)p-diethylamino benzaldehyde diphenyl hydrazone, or conjugated polymers comprising combinations thereof and the like, and these may be used alone or in combination of a plurality of them.

The energy absorption inhibitor is a substance that hardly absorbs an electromagnetic radiation. As such a substance, exemplified are substances that reflect an electromagnetic radiation such as titanium, heat insulating powders such as mica powder and ceramic powder, and water, and these may be used alone or in combination of a plurality of them.

These selective absorbers or selective inhibitors may be used alone or can be used in combination.

In the step of printing the selective absorber or selective inhibitor in a shape corresponding to the cross-sectional shape of the object to be modeled, a known technique such as inkjet can be used. In this example, the selective absorber or selective inhibitor may be used as it is or may be used after being dispersed or dissolved in a solvent.

Next, the resin powder and resin granular material will be described in detail.

The D50 particle size of the resin powder (A) is preferably 1 nm or more and 50 nm or less. If the D50 particle size exceeds 50 μm, the maximum particle size in the resin powder becomes greater than the layering height, thereby making it impossible to lower the layering height in modeling, and a model object with a small surface roughness in the Z direction cannot be obtained, that is not preferred. If the D50 particle size is less than 1 μm, the resin powder (A) is so fine that it easily adheres to a recoater or the like during modeling, thereby making it impossible to elevate the temperature of a modeling chamber to a required level, that is not preferred. The upper limit of the D50 particle size of the resin powder is more preferably 45 nm or less, further preferably 40 nm or less, and particularly preferably 35 nm or less. The lower limit is more preferably 3 nm or more, further preferably 5 nm or more, and particularly preferably 10 nm or more.

The D50 particle size of resin powder (A) can be measured with a laser diffraction particle size distribution analyzer. The D50 particle size indicates a particle size at which the cumulative frequency from the small particle size side of the particle size distribution obtained by such measurement becomes 50%.

The D80 particle size of the resin powder (A) is 60 μm or less. When the D80 particle size is 60 μm or less, the number of particles with a particle size larger than the layering height is reduced, the unevenness of the model object in the X and Y directions is decreased, and as a result, a model object with a small surface roughness can be obtained. The D80 particle size is preferably 55 μm or less, more preferably 50 μm or less, further preferably 48 μm or less, particularly preferably 46 μm or less, and extremely preferably 45 μm or less. Further, the lower limit thereof is theoretically D50 particle size or more.

The D80 particle size of the resin powder (A) can be measured by the laser diffraction particle size distribution analyzer aforementioned. The D80 particle size indicates a particle size at which the cumulative frequency from the small particle size side of the particle size distribution obtained by such a measurement becomes 80%.

The D20 particle size of the resin powder (A) is 1 μm or more. If the D20 particle size is less than 1 μm, the powder tends to be caught in the recoater during layering, and the powder drops from the recoater to cause occurrence of a mottled pattern, which is not preferred. The D20 particle size is preferably 2 μm or more, more preferably 3 μm or more, further preferably 5 μm or more, particularly preferably 7 μm or more, and extremely preferably 10 μm or more. Further, the upper limit thereof is theoretically D50 particle size or less.

The D20 particle size of the resin powder (A) can be measured by the laser diffraction particle size distribution analyzer aforementioned. The D20 particle size indicates a particle size at which the cumulative frequency from the small particle size side of the particle size distribution obtained by such a measurement becomes 20%.

The sphericity indicates the sphericalness of the resin powder (A) and is 80 or more and 100 or less. If the sphericity is less than 80, the flowability deteriorates and the surface of the model object becomes rough. The sphericity is preferably 85 or more and 100 or less, more preferably 90 or more and 100 or less, further preferably 93 or more and 100 or less, particularly preferably 95 or more and 100 or less, and extremely preferably 97 or more and 100 or less.

The sphericity is an average value of the ratio of the minor axis to the major axis of each of 30 particles observed at random from photographs taken with a scanning electron microscope.

The surface smoothness and internal solidity of the resin powder (A) can be represented by a BET specific surface area determined by gas adsorption. If the surface of the resin powder is smooth and the interior thereof is solid, the surface area becomes thereof becomes small, the flowability is improved, and the surface of the model object becomes smooth, which is preferred. It means that the smoother the surface, the smaller the BET specific surface area. Concretely, it is preferably 10 $m^2/g$ or less, more preferably 5 $m^2/g$ or less, further preferably 3 $m^2/g$ or less, particularly preferably 1 $m^2/g$ or less, and most preferably 0.5 $m^2/g$ or less. Further, the lower limit is theoretically 0.05 $m^2/g$ when the particle size is 100 μm.

The BET specific surface area can be measured according to Japanese Industrial Standards (JIS Standards) JIS R 1626 (1996) "Method for measuring specific surface area by gas adsorption BET method."

The theoretical specific surface area when the resin powder is complete sphere can be represented by a ratio of the surface area of a single sphere calculated from the D50 particle size of the resin powder and the weight of a single sphere which is the product of the volume of the single sphere calculated from the D50 particle size of the resin powder and the density thereof. The solidity of the resin powder (A) can also be evaluated by a ratio of the BET specific surface area and the above-described theoretical specific surface area calculated from the D50 particle size. The closer to 1 the above-described ratio is, the more adsorption occurs only on the outermost surface of the particles, indicating that the particles are solid and have smooth surfaces. It is preferably 5 or less, more preferably 4 or less, further preferably 3 or less, and most preferably 2 or less. Further, the lower limit thereof is theoretically 1.

The resin granular material exhibits a high flowability. As the index, any known measurement method can be employed. As the concrete example, a contact angle can be exemplified, and the angle is preferably 40 degrees or less. It is more preferably 37 degrees or less, further preferably 35 degrees or less, and particularly preferably 33 degrees or less. The lower limit thereof is 20 degrees or more.

The polymer forming the resin powder is a polymer suitable for manufacturing a 3-dimensional model object by the powder bed fusion method, preferably it comprises polyethylene, polypropylene, polyester, polyamide, polyphenylene sulfide, polyetheretherketone, polyetherimide, polyamideimide, polyethersulfone, polytetrafluoroethylene or a mixture thereof. From the viewpoint that the obtained 3-dimensional model object is excellent in thermal resistance, polyester, polyamide, polyphenylene sulfide, polyetheretherketone, polyetherimide, polyamideimide, polyethersulfone, and polytetrafluoroethylene are more preferable, from the viewpoint that the difference between the melting point and the crystallization temperature is clear and the modeling property and the reproducibility are excellent, polyester, polyamide, polyphenylene sulfide, polyetheretherketone, and polytetrafluoroethylene are further preferable, and among these, from the viewpoint that the modeling property is excellent in a versatile modeling machine, polyester and polyamide are particularly preferable, and further, from the viewpoint that the obtained model object is excellent in mechanical properties such as toughness and strength, polyamide is remarkably preferable.

The polyamide is obtained by polycondensation of a lactam having a 3-membered ring or more, a polymerizable amino carboxylic acid, a dibasic acid and a diamine, a salt thereof, or a mixture thereof. As concrete examples of such polyamides, exemplified are polycaproamide (polyamide 6), polyundecamide (polyamide 11), polylauroamide (polyamide 12), polyhexamethylene adipamide (polyamide 66), polydecamethylene sebacamide (polyamide 1010), polydodecamethylene sebacamide (polyamide 1012), polydodecamethylene dodecamide (polyamide 1212), polyhexamethylene sebacamide (polyamide 610), polyhexamethylene dodecamide (polyamide 612), polydecamethylene adipamide (polyamide 106), polydodecamethylene adipamide (polyamide 126), polyhexamethylene terephthalamide (polyamide 6T), polydecamethylene terephthalamide (polyamide 10T), polydodecamethylene terephthalamide (polyamide 12T), polycaproamide/polyhexamethylene adipamide copolymer (polyamide 6/66), polycaproamide/polylauroamide copolymer (polyamide 6/12) and the like. Among them, from the viewpoint of being easily controlled into a spherical shape, exemplified are polycaproamide (polyamide 6), polyundecaamide (polyamide 11), polylauroamide (polyamide 12), polyhexamethylene adipamide (polyamide 66), polydecamethylene sebacamide (polyamide 1010), polydodecamethylene sebacamide (polyamide 1012), polydodecamethylene dodecamide (polyamide 1212), polyhexamethylene sebacamide (polyamide 610), polyhexamethylene dodecamide (polyamide 612) and the like. Further, from the viewpoint of having a thermal property suitable for modeling, polycaproamide (polyamide 6), polyundecaamide (polyamide 11), polylauroamide (polyamide 12), polyhexamethylene adipamide (polyamide 66), and polydecamethylene sebacamide (polyamide 1010) and polydodecamethylene sebacamide (polyamide 1012) are particularly preferred. Among these, from the viewpoint of thermal resistance during modeling, polycaproamide (polyamide 6) and polyhexamethylene adipamide (polyamide 66) are remarkably preferred.

The polyester is obtained by polycondensation of a lactone or lactide having a three-membered ring or more, a polymerizable hydroxycarboxylic acid, a dibasic acid and a polyhydric alcohol or salts thereof, or a mixture thereof. As concrete examples of such a polyester, exemplified are polycaprolactone, polylactic acid, polyglycolic acid, polyethylene terephthalate, polypropylene terephthalate, polybutylene terephthalate, polycyclohexanedimethylene terephthalate, polyhexylene terephthalate, polyethylene naphthalate, polypropylene naphthalate. polybutylene naphthalate, polyethylene succinate, polypropylene succinate, polybutylene succinate, polyethylene adipate, polypropylene adipate, polybutylene adipate, and copolymers thereof. Among them, from the viewpoint of having a thermal property suitable for modeling, exemplified are polylactic acid, polyglycolic acid, polybutylene terephthalate, polybutylene succinate, polybutylene adipate, and copolymers thereof. Further, from the viewpoint excellent in biodegradability, polylactic acid and polybutylene succinate are particularly preferred.

The above-described polyamide and polyester may be copolymerized as long as the desired effects are not impaired. As the copolymerizable component, an elastomer component such as polyolefin or polyalkylene glycol which imparts a flexibility, or a rigid aromatic component which improves thermal resistance and strength can be appropriately selected. Further, though described later, a copolymerization component which adjusts terminal groups may be used to reuse the resin powder by the powder bed fusion method. As such a copolymerization component, monocarboxylic acids such as acetic acid, hexanoic acid, lauric acid and benzoic acid, and monoamines such as hexylamine, octylamine and aniline are exemplified.

A known method can be used for production of the resin powder, and exemplified are a submerged drying method in which a polymer is dissolved in an organic solvent, charged into water to form an O/W emulsion, and then the organic solvent is dried under reduced pressure and removed to produce fine particles, a method described in WO2012/043509 in which a polymer and polyvinyl alcohol are dissolved in an organic solvent to form an emulsion, and then water, which is a poor solvent for the polymer, is contacted thereto to produce fine particles, and a method previously disclosed by us and described in WO2018/207728 in which a polyamide monomer is polymerized at a temperature higher than the crystallization temperature of the polyamide in the presence of a polymer incompatible with the polyamide, and then the resin powder is produced by washing and drying. Among these, from the viewpoint capable of reducing the content of auxiliary components used in the resin powder production process or the like by washing the resin powder and obtaining a resin powder excellent in modeling property, the method described in WO2018/207728 is preferred.

The production of the resin powder preferably includes a step of removing coarse particles and fine particles so that the D80 particle size becomes 60 μm or less and the D20 particle size becomes 1 μm or more in the purification step of isolating the resin powder. Either a wet classification method or a dry classification method can be used to remove coarse particles and fine particles, but the wet classification method is preferred from the viewpoint that the particles can be monodispersed and classified with a high accuracy.

As the wet classification method preferably used to remove coarse particles, a known method can be used, for example, a wet sieving classification method using a sieve, a liquid cyclone method utilizing a sedimentation velocity difference, a decantation method or the like can be exemplified, but the wet sieving classification method is preferred from the viewpoint capable of efficiently removing coarse particles.

As the wet classification method preferably used to remove fine particles, a known method can be used, for example, a wet sieving classification method, a liquid cyclone method utilizing a sedimentation velocity difference, a decantation method and the like can be exemplified, but the liquid cyclone method and the decantation method are preferred from the viewpoint capable of selectively removing only fine particles.

In the preferred resin powder, the content of subcomponents used in the resin powder production process and the like is less than 0.1% by mass. Since such subcomponents may cause deterioration of the flowability and recyclability of the powder composition, it is more preferably less than 0.05% by mass, further preferably less than 0.01% by mass, particularly preferably less than 0.007% by mass, significantly preferably less than 0.004% by mass, and most preferably less than 0.001% by mass. The content of such subcomponents can be analyzed by a known method, for example, after extraction from the resin powder with water or an organic solvent, after removing the solvent, it can be quantified by gel permeation chromatography using water as a solvent.

An additional heat treatment may be applied to the obtained resin powder as long as the desired effect is not impaired. As the heat treatment method, a known method can be used, and a normal pressure heat treatment using an oven or the like, a reduced pressure heat treatment using a vacuum dryer or the like, and a pressurizing heat treatment heating together with water in a pressure vessel such as an autoclave can be appropriately selected. By the heat treatment, it is possible to control the molecular weight, crystallinity and melting point of the resin powder within desired ranges.

Other compounds may be added to the resin powder as long as the desired effects are not impaired. As the other compounds, for example, antioxidants, thermal stabilizers and the like can be exemplified to suppress thermal deterioration due to heating during modeling by the powder bed fusion method. As the antioxidants and thermal stabilizers, exemplified are hindered phenol, hydroquinone, phosphite group and substituted products thereof, a phosphite, a hypophosphite and the like. In addition to these, exemplified are pigments and dyes for coloring, plasticizers for viscosity control, flow aids for modifying flowability, antistatic agents for functionalization, fillers such as flame retardants, carbon black, silica, titanium dioxide, glass fibers and glass beads, and carbon fibers and the like. For these, known substances can be used, and they may be present any of inside or outside the resin powder.

The resin granular material is characterized by comprising a flow aid (B). The flow aid (B) indicates a substance which suppresses aggregation of resin powder due to adhesion between resin particles. By containing the flow aid (B), the flowability of the resin granular material can be improved, and the filling property of the resin powder becomes high when it is made into a model object. As a result, defects that affect mechanical properties are reduced, and the strength of the obtained model object tends to be more improved.

As such flow aids, for example, exemplified are silica (silicon dioxide) such as fused silica, crystalline silica, and amorphous silica, alumina such as alumina (aluminum oxide), alumina colloid (alumina sol), and alumina white, calcium carbonate such as light calcium carbonate, heavy calcium carbonate. micronized calcium carbonate, and special calcium carbonate-based filler, calcined clay such as nepheline syenite fine powder, montmorillonite, and bentonite, clay (aluminum silicate powder) such as silane modified clay, silicic acid-containing compounds such as talc, diatomaceous earth, and silica sand, pulverized natural minerals such as pumice powder, pumice balloon, slate powder, and mica powder, minerals such as barium sulfate, lithopone, calcium sulfate, molybdenum disulfide, and graphite, glass-based fillers such as glass fibers, glass beads, glass flakes, and foamed glass beads, fly ash spheres, volcanic glass hollow materials, synthetic inorganic hollow materials, single crystal potassium titanate, carbon fibers, carbon nanotubes, carbon hollow spheres, fullerenes, anthracite powder, artificial cryolite (cryolite), titanium oxide, magnesium oxide, basic magnesium carbonate, dolomite, potassium titanate, calcium sulfite, mica, asbestos, calcium silicate, molybdenum sulfide, boron fibers, silicon carbide fibers and the like. Silica, alumina, calcium carbonate powder, glass-based filler, and titanium oxide are more preferred. Particularly preferably, silica is exemplified because it is hard and can contribute to improvement in strength and fluidity.

As commercially available products of such a silica, exemplified are fumed silica "AEROSIL" (registered trademark) series supplied by NIPPON AEROSIL Co., Ltd., dry silica "Reolosil" (registered trademark) series supplied by Tokuyama Corporation, sol-gel silica powder X-24 series supplied by Shin-Etsu Chemical Co., Ltd. or the like.

D50 particle size of such a flow aid (B) is preferably 20 nm or more and 1 μm or less. The upper limit of the D50 particle size of the flow aid (B) is preferably 1 μm or less, because a smaller particle size and a larger surface area can suppress aggregation of the resin powder with a smaller amount. It is more preferably 500 nm or less, further preferably 400 nm or less, particularly preferably 300 nm or less, and extremely preferably 250 nm or less. The lower limit is preferably 20 nm or more because if the surface area is too large, the filling property is hindered and the density of the model object decreases. It is more preferably 30 nm or more, further preferably 50 nm or more, and particularly preferably 100 nm or more. When the average particle size of the flow aid (B) is within the above-described range, the flowability of the resin granular material can be improved and it tends to be able to disperse the flow aid (B) uniformly in the resin powder.

The D50 particle size of the flow aid (B) is a value at which a cumulative curve from its small particle size side becomes 50% when the cumulative curve is determined by referring to the total volume of fine particles obtained by analyzing the scattered beam of the laser by the dynamic beam scattering method as 100%.

The compounding amount of such a flow aid (B) is more than 0.01 part by mass and less than 5 parts by mass with respect to 100 parts by mass of the resin powder (A). The upper limit of the compounding amount is preferably less than 4 parts by mass, more preferably less than 3 parts by mass, further preferably less than 2 parts by mass, and particularly preferably less than 1 part by mass. Further, the lower limit of the compounding amount is preferably more than 0.02 part by mass, more preferably more than 0.03 part by mass, further preferably more than 0.05 part by mass, and particularly preferably more than 0.1 part by mass. If the compounding amount of the flow aid (B) is 0.01 part by mass or less, the flowability is poor, and it causes deterioration of the surface roughness of the model object to be obtained, chipping at an end portion of the model object, and generation of voids. Moreover, the filling property during modeling deteriorates, voids which become defects in mechanical properties are likely to occur, and the strength of the model object to be obtained decreases. Further, when the compounding amount of the flow aid is 5 parts by mass or more, the surface of the resin powder is coated with the flow aid, which hinders sintering and reduces the strength of the model object.

The compounding amount of the flow aid (B) with respect to the resin powder (A) can be selected within a preferred range according to the particle size of the resin powder and the particle size of the flow aid. When the D50 particle size of the resin powder (A) is referred to as D50(A), the D50 particle size of the flow aid (B) is referred to as D50(B), and the content of the flow aid (B) with respect to 100 parts by mass of the resin powder (A) is referred to as X parts by mass, when $D50(A) \times X / D50(B)$ is more than 30 and less than 300. $D50(A) \times X / D50(B)$ is preferably more than 30 and less than 300. When $D50(A) \times X / D50(B)$ is 30 or less, the flow aid cannot sufficiently suppress the aggregation of the resin powder and the flowability is lowered, which is not preferred. The lower limit thereof is more preferably more than 35, further preferably more than 40, and particularly preferably more than 50. When $D50(A) \times X / D50(B)$ is 300 or more, the flow aid completely coats the resin powder and hinders sintering, which is not preferred. The upper limit thereof is more preferably less than 250, further preferably less than 200, particularly preferably less than 150, and significantly preferably less than 100.

Further, in the powder bed fusion method, a model object is made by a part of the used resin granular material, and much of the resin granular material is remained. Reusing the resin granular material becomes important from the viewpoint of cost. For this, it becomes important not to change the properties of the resin granular material during the heating and modeling process. As such a method, for example, exemplified are a method of suppressing thermal deterioration by compounding a stabilizer such as an antioxidant into the inside of the particles or the like, a method of suppressing a change in molecular weight during modeling by reducing end groups of the polyamide and the like. The end group of polyamide is a carboxyl group or an amino group, and it is preferable to reduce the amino groups from the viewpoint of high reactivity during modeling and heating. As the method of reducing these, for example, when polymerizing polyamide, a method of using a monofunctional blocking agent such as a monocarboxylic acid such as acetic acid, hexanoic acid, lauric acid and benzoic acid or a monoamine such as hexylamine, octylamine, and aniline is employed. By employing such an adjustment appropriately, it tends to make it possible to achieve both modeling property and reuse.

The resin granular material may contain an inorganic reinforcing material (C) comprising an inorganic compound from the viewpoint capable of enhancing the dimensional accuracy of the model object. When the inorganic reinforcing material is contained, it is possible to suppress the volume change associated with fusion and joining. The inorganic reinforcing material may be dry-blended with the resin powder (A), or may be contained inside the resin powder (A), but it is preferably dry-blended from the viewpoint of controlling the resin powder (A) into a spherical shape and improving the flowability.

As such an inorganic reinforcing material (C), for example, exemplified are glass fillers such as glass fibers, glass beads, glass flakes, and foamed glass beads, calcined clays such as nepheline syenite fine powder, montmorillonite, and bentonite, and clays (aluminum silicate powder) such as silane modified clays, silicic acid-containing compounds such as talc, diatomaceous earth, and silica sand, pulverized natural minerals such as pumice powder, pumice balloon, slate powder, and mica powder, minerals such as barium sulfate, lithopone, calcium sulfate, molybdenum disulfide, and graphite, silica (silicon dioxide) such as fused silica, crystalline silica, and amorphous silica, alumina such as alumina (aluminum oxide), alumina colloid (alumina sol), and alumina white, calcium carbonate such as light calcium carbonate, heavy calcium carbonate. micronized calcium carbonate, and special calcium carbonate-based filler, fly ash spheres, volcanic glass hollow materials, synthetic inorganic hollow materials, single crystal potassium titanate, potassium titanate fibers, carbon fibers, carbon nanotubes, carbon hollow spheres, fullerene, anthracite powder, cellulose nanofibers, artificial cryolite (cryolite), titanium oxide, magnesium oxide, basic magnesium carbonate, dolomite, calcium sulfite, mica, asbestos, calcium silicate, molybdenum sulfide, boron fibers, silicon carbide fibers and the like. Glass-based fillers, minerals, and carbon fibers are preferable because they are hard and have a large strength-enhancing effect, and glass-based fillers are more preferable because they have a narrow particle size distribution and a narrow fiber diameter distribution. These inorganic reinforcing materials can be used alone or in combination of two or more.

As examples of preferred glass-based fillers, glass fibers, glass beads, glass flakes, and foamed glass beads are exemplified, but glass fibers and glass beads are particularly preferred from the viewpoint capable of exhibiting a high elastic modulus of a 3-dimensional model object. Among these, glass fibers are significantly preferable from the viewpoint that the model object becomes high-strength, and the glass fibers may have a circular cross section or a flat cross section. Further, glass beads are remarkably preferable because the strength anisotropy of the model object is small.

For the purpose of improving the adhesion between the inorganic reinforcing material and the polymer powder, it is possible to use a surface-treated inorganic reinforcing material within the range that does not impair the desired effects. As examples of such surface treatments, silane coupling agents such as amino silane, epoxy silane, and acrylic silane can be exemplified. These surface treatment agents may be immobilized on the surface of the inorganic reinforcing material by a coupling reaction, or may coat the surface of the inorganic reinforcing material, but in view of being difficult to be modified by heat or the like, those immobilized by a coupling reaction are preferable.

The average major axis diameter of the inorganic reinforcing material is preferably 3-100 μm. If the average major axis diameter exceeds 100 μm, unevenness of the inorganic reinforcing material appears on the modeling surface and impairing the surface smoothness, which is not preferred. If the average major axis diameter is less than 3 μm, it is not preferred because it cannot contribute to the improvement of the elastic modulus. The upper limit of the average major axis diameter of the inorganic reinforcing material is preferably 80 μm or less, more preferably 70 μm or less, further preferably 60 μm or less, and particularly preferably 50 μm or less. The lower limit is preferably 5 μm or more, more preferably 8 μm or more, and further preferably 10 μm or more.

The shape of the inorganic reinforcing material is represented by average major axis diameter/average minor axis diameter, which is the ratio of the average major axis diameter to the average minor axis diameter, and it is 1 or more and 15 or less. If the average major axis diameter/average minor axis diameter exceeds 15, the orientation in the X direction in the model object becomes conspicuous and the strength anisotropy with respect to the Z direction becomes large, which is not preferred. Therefore, the average major axis diameter/average minor axis diameter is preferably 12 or less, more preferably 10 or less, and further preferably 8 or less. Further, the lower limit is theoretically 1. Among these, from the viewpoint of increasing the strength, it is particularly preferably 2 or more and 8 or less, and extremely preferably 3 or more and 8 or less. From the viewpoint of reducing the anisotropy, it is particularly preferably 1 or more and 5 or less, and extremely preferably 1 or more and 3 or less.

The average major axis diameter and average minor axis diameter of the inorganic reinforcing material are number average values of major axis diameters and minor axis diameters observed from 100 fibers or particles randomly selected from a photograph obtained by imaging the inorganic reinforcing material with a scanning electron microscope. The major axis diameter is a diameter at which the distance between the parallel lines when the image of the particle is sandwiched between two parallel lines becomes the maximum, and the minor axis diameter is a diameter that minimizes the distance between parallel lines when sandwiched between two parallel lines in a direction perpendicular to the direction of the major axis diameter. When measuring the average major axis diameter and average minor axis diameter of the inorganic reinforcing material, the major axis diameter and minor axis diameter may be measured by selecting the inorganic reinforcing materials from the photograph of a scanning electron microscope of the powder composition as shown in FIG. 2.

The compounding amount of such an inorganic reinforcing material is preferably 10 parts by mass or more and 200 parts by mass or less with respect to 100 parts by mass of the resin powder (A). The upper limit of the compounding amount is more preferably 150 parts by mass or less, further preferably 100 parts by mass or less, and particularly preferably 75 parts by mass or less from the viewpoint capable of obtaining a model object excellent in surface smoothness. Further, the lower limit of the compounding amount is more preferably 15 parts by mass or more, further preferably 20 parts by mass or more, and particularly preferably 25 parts by mass or more from the viewpoint capable of improving the elastic modulus and strength of the model object.

The surface roughness in the X and Y directions, which correspond to the plane direction in which the resin granular material of the model object is layered, is 20 μm or less. The smaller the surface roughness, the better the adherence of a joined portion between model objects and, therefore, the surface roughness of the model objects in the X and Y directions is preferably 18 μm or less, more preferably 15 μm or less, further preferably 12 μm or less, and particularly preferably 10 μm or less.

The surface roughness in the Z direction, which is the height direction in which the resin granular material of the model object is layered, indicates a surface roughness in the direction perpendicular to the X and Y directions. The surface roughness of the model object in the Z direction is 20 μm or less, preferably 18 μm or less, more preferably 15 μm or less, further preferably 12 μm or less, and particularly preferably 10 μm or less. Since the surface roughness in the Z direction depends on the layer height during modeling, the lower limit of the surface roughness in the Z direction is preferably 1 μm or more, more preferably 3 μm or more, and further preferably 5 μm or more.

The surface roughness of the model object is a value determined by observing the surface of the model object with an optical microscope, creating a 3-dimensional image of the unevenness of the surface of the model object by an automatic synthesis mode, and then obtaining a cross-sectional height profile over a length of 1 mm or more. and calculating the surface roughness Ra (arithmetic average roughness) by taking an arithmetic average.

Further, in a 3-dimensional modeling, because a model object is manufactured by melting and sintering under a normal pressure from a state filled with powder, usually a change in density caused by a shrinkage is accompanied. Therefore, to obtain the dimensions of the 3-dimensional model object with a high accuracy for desired modeling data, it is preferred to have an appropriate amount of voids inside. The ratio and the shapes of the voids present in the 3-dimensional model object can be observed by X-ray CT.

The 3-dimensional model object is imaged by X-ray CT, and the ratio of the portions observed as voids to the volume of the entire model object can be represented as a porosity. The porosity observed by X-ray CT measurement of the 3-dimensional model object is preferably 0.1% by volume or more and 5.0% by volume or less. If the lower limit of the porosity is too low, because there occurs a problem that the entire model object shrinks relatively to the modeling data, it is more preferably 0.2% by volume or more, further preferably 0.3% by volume or more, and particularly preferably 0.5% by volume or more. Further, with respect to the upper limit thereof, because many voids may cause a decrease in strength, it is more preferably 4.0% by volume or less, further preferably 3.0% by volume or less, and particularly preferably 2.0% by volume or less.

The 3-dimensional model object is imaged by X-ray CT, and the size of each independent void observed as the voids can be represented as an equivalent spherical diameter. The average spherical equivalent diameter of voids observed by X-ray CT measurement of the 3-dimensional model object is preferably 1 μm or more and 100 μm or less. In melt molding that does not rely on a 3-dimensional modeling process, the average spherical equivalent diameter of the voids is usually designed to become less than 1 μm, and in intentionally forming voids such as foam molding, usually the average equivalent spherical diameter of the voids exceeds 100 μm, and therefore, the average equivalent spherical diameter of 1 μm or more and 100 μm or less is a feature of the 3-dimensional model object. As described above, in the 3-dimensional modeling under a normal pressure, a certain amount of voids are generated, and because the problem of shrinkage of the entire model object occurs by the voids, the lower limit thereof is preferably 3 μm or more, more preferably 5 μm or more, and further preferably 10 μm or more. Because large voids become defects and cause a decrease in strength of the model object, the upper limit thereof is preferably 80 nm or less, more preferably 60 nm or less, and further preferably 50 nm or less.

Further, because a 3-dimensional model object is obtained by crystallization in a process of lowering the temperature under a normal pressure and at a lower speed as compared to a usual melt molding, although the crystal state is different from that in a usual melt molding, because it is difficult to express it as a feature of an object, it is one limited by the manufacturing method, that is one obtained by 3-dimensional modeling, preferably the powder bed fusion method. Although it is well known that it is possible to obtain a molded product with a smooth surface depending on the structure of the mold in a usual melt molding, in a 3-dimensional modeling capable of molding into a complicated shape, a molded product with a smooth surface cannot be obtained, and our methods made it possible for the first time.

The 3-dimensional model object can obtain a model object with a small surface roughness in the X and Y directions and a small surface roughness in the Z direction. Further, it is excellent in adherence of joined portions between model objects, and good lubricity and adherence can be obtained for male-female structures such as screws. Furthermore, in pipes and the like, it is possible to reduce a leakage from joints by the good adherence.

EXAMPLES

Hereinafter, our methods, resin granular materials and model objects will be explained based on examples.

(1) D80 Particle Size, D50 Particle Size and D20 Particle Size of Resin Powder:

A dispersion prepared by previously dispersing about 100 mg of resin granular material in about 5 mL of deionized water was added to a laser diffraction particle size distribution analyzer (Microtrac MT3300EXII) supplied by Nikkiso Co., Ltd. until it reached a measurable concentration, after performing a ultrasonic dispersion for 60 seconds at 30 W in the measuring device, the particle size at which the cumulative frequency from the small particle size side of the particle size distribution measured at a measurement time of 10 seconds became 80% was referred to as the D80 particle size of the resin powder, the particle size at which the cumulative frequency became 50% was referred to as the D50 particle size of the resin powder, and the particle size at which the cumulative frequency became 20% was referred to as the D20 particle size of the resin powder. For the refractive index at the time of measurement, 1.52 was used, and for the refractive index of the medium (deionized water), 1.333 was used.

(2) Sphericity of Resin Powder:

The sphericity of the resin powder was determined by observing 30 particles at random from a photograph of a scanning electron microscope (supplied by JEOL Ltd., scanning electron microscope: JSM-6301NF) and calculating an average value of the ratio of the minor axis to the major axis.

(3) Solidity of Resin Powder by Ratio of BET Specific Surface Area to Theoretical Specific Surface Area:

According to Japanese Industrial Standards (JIS Standards) JISR1626 (1996) "Method for measuring specific surface area by gas adsorption BET method," using BELSORP-max supplied by Nippon Bell Co., Ltd., about 0.2 g of resin granular material was placed in a glass cell, and after degassing under a reduced pressure at 80° C. for about 5 hours, the krypton gas adsorption isotherm at a liquid nitrogen temperature was measured and calculated by the BET method.

Furthermore, from the ratio of the surface area of a single sphere calculated from the D50 particle size of the resin powder and the weight of the single sphere which was the product of the volume and density of the single sphere calculated from the D50 particle size of the resin powder, the theoretical specific surface area of the resin powder was calculated. The solidity of the resin powder was evaluated by calculating the ratio of the BET specific surface area to the theoretical specific surface area.

(4) Crystallization Temperature and Melting Point of Resin Granular Material:

Using a differential scanning calorimeter (DSCQ20) supplied by TA Instruments Japan Inc., under a nitrogen atmosphere, the temperature was elevated from 30° C. to a temperature higher by 30° C. from the endothermic peak indicating the melting point of the resin at a rate of 20° C./min and then the temperature was held for 1 minute, and the apex of the exothermic peak which appeared when the temperature was cooled to 30° C. at a rate of 20° C./min was taken as the crystallization temperature. After cooling, the endothermic peak when the temperature was further elevated at 20° C./min was taken as the melting point. About 8 mg of resin granular material was required for the measurement.

(5) Content of Subcomponents of Resin Powder:

400 g of water was added to 200 g of resin powder, and the mixture was retained at 80° C. for 1 hour to extract subcomponents. The weight in the extracted solution was determined by comparing the extracted solution sample with a calibration curve prepared from subcomponents using a gel permeation chromatography method. The content (% by mass) of the subcomponents of the resin powder was calculated by dividing the weight of the subcomponents by the weight of the resin powder.

Device: LC-10A series supplied by Shimadzu Corporation
Column: TSKgelG3000PWXL supplied by Tosoh Corporation
Moving phase: 100 mmol/L sodium chloride aqueous solution
Flow rate: 0.8 ml/min
Temperature: 40° C.
Detection: differential refractometer.

(6) Average Major Axis Diameter and Average Minor Axis Diameter of Inorganic Reinforcing Material:

The inorganic reinforcing material was observed with a scanning electron microscope (JSM-6301NF) supplied by JEOL Ltd., and average values of the major axis diameters and minor axis diameters of 100 inorganic reinforcing materials randomly selected from the photograph were referred to as the average major axis diameter and average minor axis diameter.

(7) Evaluation of Flowability of Resin Granular Material:

Using a multitester MT-1 supplied by Seishin Enterprise Co., Ltd., 100 g of resin granular material was dropped from a funnel onto a flat plate, and the angle formed between the slope of the piled mountain and the plate: the angle of repose was measured. If the angle of repose was 40 degrees or less, the fluidity was evaluated as "good," and if it exceeded 40 degrees, it was evaluated as "bad."

(8) Surface Roughness of Model Object:

The surface roughness of the 3-dimensional model object manufactured using the resin granular material was determined by preparing a test piece with a width of 20 mm, a length of 20 mm and a thickness of 10 mm using a powder bed fusion method-3D printer (a powder bed fusion device supplied by Aspect Inc., RaFaEl II 150C-HT), and observing the surface of the model object at a magnification of 200 times using an optical microscope (VHX-5000) supplied by Keyence Corporation and its objective lens of VH-ZST (ZS-20). Using a software attached to the device (system version 1.04), after converting the unevenness of the surface of the model object into a 3-dimensional image with the automatic synthesis mode, the height profile of the cross section was taken over a length of 1 mm or more, and the surface roughness Ra (center line average surface roughness) was calculated as an arithmetic average. The smaller the surface roughness Ra, the more excellent the smoothness (quality) of the surface.

(9) Flexural Strength of Model Object:

The flexural strength of a 3-dimensional model object manufactured using a resin granular material was determined by preparing a test piece with a width of 10 mm, a length of 80 mm and a thickness of 4 mm using a powder bed fusion method-3D printer (a powder bed fusion device supplied by Aspect Inc., RaFaEl II 150C-HT), and using a Tensilon universal tester (TENSIRON TRG-1250, supplied by A&D Corporation). According to JIS K7171 (2008), a three-point bending test was performed under the conditions of a distance between fulcrums of 64 mm and a test speed of 2 mm/min to determine the flexural strength. The measurement temperature was a room temperature (23° C.), the number of measurements was n=5, and the average value thereof was determined.

(10) Adherence of Joined Portion Between Model Objects:

The adherence of a joined portion between 3-dimensional model objects each manufactured using a resin granular material was determined by modeling a pipe shape using a powder bed fusion method-3D printer (a powder bed fusion device supplied by Aspect Inc., RaFaEl II 150C-HT), joining two pipes, and evaluating the water leakage from the joint when passing water. When there was no water leakage, the adherence was determined to be good, and when water leaked, the adherence was determined to be not good.

Production Example 1 (Polyamide 12 Powder)

300 g of amino dodecanoic acid (supplied by FUJIFILM Wako Pure Chemical Corporation) as a polyamide monomer, 700 g of polyethylene glycol (supplied by FUJIFILM Wako Pure Chemical Corporation, first grade polyethylene glycol 20,000, weight average molecular weight: 18,600) as a polymer incompatible with the polyamide and 1,000 g of water were added into a 3 L autoclave attached with a helical ribbon type stirring blade to form a uniform solution, it was sealed and then substituted with nitrogen. Thereafter, the stirring speed was set at 60 rpm and the temperature was elevated to 210° C. At this time, after the pressure of the system reached 10 $kg/cm^2$, the pressure was controlled to maintain the pressure at 10 $kg/cm^2$, while slightly releasing the steam. After the temperature reached 210° C., the pressure was released at a rate of 0.2 $kg/cm^2 \cdot min$. Thereafter, the temperature was maintained for 1 hour while flowing nitrogen to complete the polymerization, and a mixture of resin powder and polyethylene glycol was discharged into a 2,000 g water bath while the polyethylene glycol was kept in a molten state to obtain a slurry. After sufficiently homogenizing the slurry by stirring, it was filtered, and 2,000 g of water was added to the filter cake and washed at 80° C. The washed slurry liquid was first sedimented by decantation, and the supernatant liquid was removed to remove fine particles which did not settle by gravity in the polyethylene glycol aqueous solution. Thereafter, 2,000 g of water was added to reslurry, and the slurry was passed through a sieve with an opening of 100 μm to remove aggregates, and the slurry was passed through a sieve with an opening of 63 μm to remove coarse particles. The filter cake isolated by filtration again was dried at 80° C. for 12 hours to prepare 240 g of polyamide 12 powder. To 100 parts by mass of this polyamide 12 powder, 0.3 part by mass of trimethyl silylated amorphous silica (X-24-9500 supplied by Shin-Etsu Chemical Co., Ltd.) having an average particle size of 170 nm was added as a flow aid. The D80 particle size of the obtained resin powder was 44 μm, the D50 particle size was 32 μm, the D20 particle size was 22 μm, the sphericity was 97, the content of subcomponents was 0.0005% by mass, and the angle of repose was 30 degrees. The BET specific surface area was 0.23 $m^2/g$, and the ratio of the BET specific surface area to the theoretical specific surface area was 1.3.

Production Example 2 (Polyamide 6 Powder 1)

A resin granular material for 3-dimensional modeling was prepared by the same method as in Production Example 1 other than conditions where amino dodecanoic acid was changed to ε-caprolactam as a polyamide monomer, and 0.5 part by mass of trimethyl silylated amorphous silica was added to 100 parts by mass of the obtained polyamide 6 powder. The D80 particle size of the obtained resin powder was 29 μm, the D50 particle size was 21 μm, the D20 particle size was 17 μm, the sphericity was 96, the content of subcomponents was 0.0006% by mass, and the angle of repose was 31 degrees. The BET specific surface area was 0.41 $m^2/g$, and the ratio of the BET specific surface area to the theoretical specific surface area was 1.6.

Production Example 3 (Polyamide 6 Powder 2)

A resin granular material for 3-dimensional modeling was prepared by the same method as in Production Example 2 other than conditions where the stirring speed of the stirring blade attached to the autoclave was changed to 45 rpm, and 0.1 part by mass of trimethyl silylated amorphous silica was added to 100 parts by mass of the obtained polyamide 6 powder. The D80 particle size of the obtained resin powder was 56 μm, the D50 particle size was 43 μm, the D20 particle size was 30 μm, the sphericity was 94, the content of subcomponents was 0.0004% by mass, and the angle of repose was 36 degrees. The BET specific surface area was 0.19 $m^2/g$, and the ratio of the BET specific surface area to the theoretical specific surface area was 1.5.

Production Example 4 (Polybutylene Terephthalate Powder)

33.25 g of polybutylene terephthalate ("Toraycon" (registered trademark) 1401X06), 299.25 g of N-methyl-2-pyrrolidone and 17.5 g of polyvinyl alcohol (PVA-1500 supplied by Wako Pure Chemical Industries, Ltd., weight average molecular weight: 29,000: sodium acetate content reduced to 0.05% by mass by washing with methanol) were added into a 1000 ml pressure-resistant glass autoclave, and after substitution with nitrogen, the mixture was heated to 180° C. and stirred for 4 hours until the polymer was dissolved. Thereafter, 350 g of ion-exchanged water as a poor solvent was added dropwise at a speed of 2.92 g/min through a liquid feed pump. After adding the entire amount of water, the temperature was lowered while stirring, the obtained suspension was filtered, 700 g of ion-exchanged water was added for reslurry washing, and the filtered material was vacuum-dried at 80° C. for 10 hours to obtain 28.3 g of polybutylene terephthalate powder. To 100 parts by mass of this polybutylene terephthalate powder, 0.5 part by mass of trimethyl silylated amorphous silica having an average particle size of 170 nm was added as a flow aid. The D80 particle size of the obtained resin powder 24 μm, the D50 particle size was 16 μm, the D20 particle size was 11 μm, the sphericity was 89, the content of subcomponents was 0.02% by mass, and the angle of repose was 39 degrees. The BET specific surface area was 0.78 $m^2/g$, and the ratio of the BET specific surface area to the theoretical specific surface area was 2.7.

Production Example 5 (Polyamide 12 Powder with Large Particle Size as a Comparative Example)

A resin granular material for 3-dimensional modeling was prepared in the same manner as in Production Example 1 other than conditions where the stirring speed of the stirring blade attached to the autoclave was changed to 25 rpm and the removal of coarse particles using a sieve with an opening of 63 μm was not performed. The D80 particle size of the obtained resin powder was 91 μm, the D50 particle size was 72 μm, the D20 particle size was 52 μm, the sphericity was 97, the content of subcomponents was 0.0004% by mass, and the angle of repose was 29 degrees. The BET specific surface area was 0.12 $m^2/g$, and the ratio of the BET specific surface area to the theoretical specific surface area was 1.5.

Production Example 6 (Polyamide 12 Powder with Small Particle Size as a Comparative Example)

A resin granular material for 3-dimensional modeling was prepared in the same manner as in Production Example 1 other than conditions where the stirring speed of the stirring blade attached to the autoclave was changed to 150 rpm, the polyamide 12 powder was produced without removing fine particles by decantation, and 1.0 part by mass of trimethyl silylated amorphous silica was added. The D80 particle size of the obtained resin powder was 7 μm, the D50 particle size was 4 μm, the D20 particle size was 0.8 μm, the sphericity was 96, and the angle of repose was 39 degrees. The BET specific surface area was 2.0 $m^2/g$, and the ratio of the BET specific surface area to the theoretical specific surface area was 1.4.

Production Example 7 (Resin Granular Material without Flow Aid as a Comparative Example)

A resin granular material for 3-dimensional modeling was prepared in the same manner as in Production Example 1 other than a condition where trimethyl silylated amorphous silica was not added to 100 parts by mass of polyamide 12 powder. The D80 particle size of the obtained resin powder was 44 μm, the D50 particle size was 32 μm, the D20 particle size was 22 μm, the sphericity was 97, and the angle of repose was 46 degrees. The BET specific surface area was 0.23 $m^2/g$, and the ratio of the BET specific surface area to the theoretical specific surface area was 1.3.

Production Example 8 (Polyamide 12 Powder with Low Sphericity as a Comparative Example)

400 g of polyamide 12 ("VESTAMID" (registered trademark) L1600) and 2.2 L of ethanol were heated to 140° C. in a 3 L autoclave and dissolved. 0.2 L of ethanol was distilled from this, cooled to 117° C., maintained for 9 hours, and thereafter, cooled to 45° C., the obtained slurry was filtered, and dried at 90° C. to prepare polyamide 12 powder. To 100 parts by mass of the prepared polyamide 12 powder, 0.1 part by mass of hydrophobized silicic acid ("AEROSIL" (registered trademark) R972) was added to prepare a resin granular material for 3-dimensional modeling. The D80 particle size of obtained resin powder was 75 μm, the D50 particle size was 56 μm, the D20 particle size was 13 μm, the sphericity was 67, the content of subcomponents was 1.54% by mass, and the angle of repose was 32 degrees. The BET specific surface area was 0.87 $m^2/g$, and the ratio of the BET specific surface area to the theoretical specific surface area was 8.4.

Production Example 9 (Resin Granular Material 1 Containing an Inorganic Reinforcing Material)

Per 100 parts by mass of the polyamide 6 powder prepared in Production Example 2, 67 parts by mass of glass beads GB731A (supplied by Potters-Ballotini Co., Ltd., average major axis diameter: 27 μm, average minor axis diameter: 26 μm) and 0.3 part by mass of trimethyl silylated amorphous silica were added and dry-blended to prepare a resin granular material for 3-dimensional modeling containing an inorganic reinforcing material.

Production Example 10 (Resin Granular Material 2 Containing an Inorganic Reinforcing Material)

To 100 parts by mass of the polyamide 6 powder prepared in Production Example 3, 43 parts by mass of EPG70M-01N (supplied by Nippon Electric Glass Co., Ltd., average major axis diameter: 73 μm, average minor axis diameter: 10 μm) and 0.3 part by mass of trimethyl silylated amorphous silica were added and dry-blended to prepare a resin granular material for 3-dimensional modeling containing an inorganic reinforcing material.

Example 1

Figure 3:
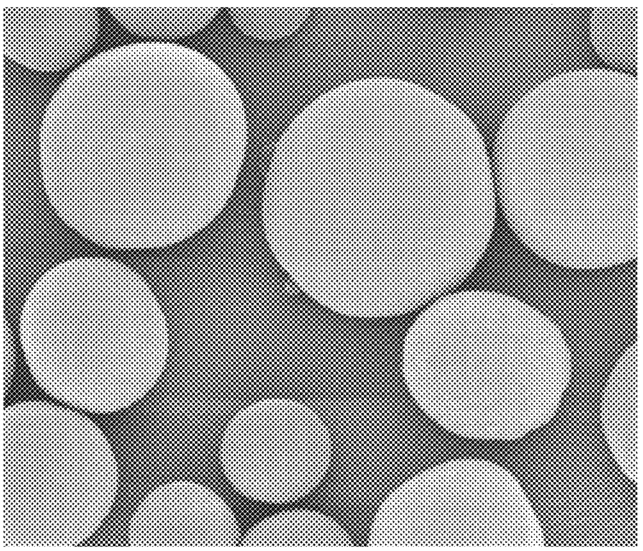
FIG. 3 is a photograph of a scanning electron microscope of resin powder (polyamide powder) obtained in Production Example 1 and used in Example 1.

Using 1.5 kg of the resin granular material prepared in Production Example 1 (a scanning electron microscope photograph is shown in FIG. 3), a powder bed fusion device (RaFaEl II 150C-HT) supplied by Aspect Inc. was used to manufacture a 3-dimensional model object. The setting conditions were use of 60 W $CO_2$ laser, layering height of 0.05 mm, laser scanning interval of 0.1 mm, laser scanning speed of 5.00 m/s, and laser output of 5 W. At this time, the laser energy Ea per unit area was 1.0 $J/cm^2$. Temperature settings were such that the part bed temperature was −15° C. from the melting point, and the supply bath temperature was −5° C. from the crystallization temperature. The properties of the resin powder and the obtained model object are shown in Table 1.

Example 2

A 3-dimensional model object was manufactured in the same manner as in Example 1 other than conditions where the setting conditions for 3D modeling were changed to a layering height of 0.07 mm and a laser output of 7 W. The properties of the resin powder and the obtained model object are shown in Table 1.

Example 3

A 3-dimensional model object was manufactured in the same manner as in Example 1 other than a condition where the resin granular material prepared in Production Example 2 was used. The properties of the resin powder and the obtained model object are shown in Table 1.

Example 4

A 3-dimensional model object was manufactured in the same manner as in Example 1 other than a condition where the resin granular material prepared in Production Example 3 was used. The properties of the resin powder and the obtained model object are shown in Table 1.

Example 5

A 3-dimensional model object was manufactured in the same manner as in Example 1 other than a condition where the resin granular material prepared in Production Example 4 was used. The properties of the resin powder and the obtained model object are shown in Table 1.

Comparative Example 1

A 3-dimensional model object was manufactured in the same manner as in Example 1 other than conditions where the setting conditions for 3-dimensional modeling were changed to a layering height of 0.10 mm and a laser output of 10 W. The properties of the resin powder and the obtained model object are shown in Table 1.

Comparative Example 2

A 3-dimensional model object was manufactured in the same manner as in Example 1 other than a condition where the resin granular material prepared in Production Example 5 was used. The properties of the resin powder and the obtained model object are shown in Table 1.

Comparative Example 3

A 3-dimensional model object was manufactured in the same manner as in Comparative Example 2 other than conditions where the setting conditions for 3D modeling were changed to a layering height of 0.10 mm and a laser output of 10 W. The properties of the resin powder and the obtained model object are shown in Table 1.

Comparative Example 4

A 3-dimensional model object was manufactured in the same manner as in Example 1 other than a condition where the resin granular material prepared in Production Example 6 was used. The properties of the resin powder and the obtained model object are shown in Table 1.

Comparative Example 5

A 3-dimensional model object was manufactured in the same manner as in Example 1 other than a condition where the resin granular material prepared in Production Example 7 was used. The properties of the resin powder and the obtained model object are shown in Table 1.

Comparative Example 6

A 3-dimensional model object was manufactured in the same manner as in Example 1 other than a condition where the resin granular material prepared in Production Example 8 was used. The properties of the resin powder and the obtained model object are shown in Table 1.

Example 6

A 3-dimensional model object was manufactured in the same manner as in Example 1 other than a condition where the resin granular material prepared in Production Example 9 was used. The properties of the resin powder and the obtained model object are shown in Table 1.

Example 7

A 3-dimensional model object was manufactured in the same manner as in Example 1 other than a condition where the resin granular material prepared in Production Example 10 was used. The properties of the resin powder and the obtained model object are shown in Table 1.

TABLE 1

| | Example 1 | Example 2 | Example 3 | Example 4 | Example 5 | Comparative Example 1 | Comparative Example 2 |
|---|---|---|---|---|---|---|---|
| D80 particle size of resin powder (μm) | 44 | 44 | 29 | 56 | 24 | 44 | 91 |
| D50 particle size of resin powder (μm) | 32 | 32 | 21 | 43 | 16 | 32 | 72 |
| D20 particle size of resin powder (μm) | 22 | 22 | 17 | 30 | 11 | 22 | 52 |
| Sphericity of resin powder | 97 | 97 | 96 | 94 | 89 | 97 | 97 |
| Addition of flow aid (part by mass) | 0.3 | 0.3 | 0.5 | 0.1 | 0.5 | 0.3 | 0.3 |
| Layering height at which resin granular material is layered (mm) | 0.05 | 0.07 | 0.05 | 0.07 | 0.05 | 0.10 | 0.05 |
| Laser energy per unit area (J/cm$^2$) | 1.0 | 1.4 | 1.0 | 1.4 | 1.0 | 2.0 | 1.0 |
| Mottled pattern on model object surface | none | none | none | none | none | none | none |
| Surface roughness of model object in layering plane direction (μm) | 6 | 5 | 4 | 10 | 17 | 5 | 32 |
| Surface roughness of model object in layering height direction (μm) | 12 | 17 | 10 | 19 | 18 | 28 | 31 |

| | Comparative Example 3 | Comparative Example 4 | Comparative Example 5 | Comparative Example 6 | Example 6 | Example 7 |
|---|---|---|---|---|---|---|
| D80 particle size of resin powder (μm) | 91 | 7 | 44 | 75 | 29 | 56 |
| D50 particle size of resin powder (μm) | 72 | 4 | 32 | 56 | 21 | 43 |
| D20 particle size of resin powder (μm) | 52 | 0.8 | 22 | 13 | 17 | 30 |
| Sphericity of resin powder | 97 | 96 | 97 | 67 | 96 | 94 |
| Addition of flow aid (part by mass) | 0.3 | 1.0 | 0 | 0.1 | 0.3 | 0.3 |
| Layering height at which resin granular material is layered (mm) | 0.10 | 0.05 | 0.05 | 0.05 | 0.05 | 0.07 |
| Laser energy per unit area (J/cm$^2$) | 2.0 | 1.0 | 1.0 | 1.0 | 1.0 | 1.4 |

TABLE 1-continued

| | | | | | | |
|---|---|---|---|---|---|---|
| Mottled pattern on model object surface | none | present | present | none | none | none |
| Surface roughness of model object in layering plane direction (μm) | 11 | 3 | 29 | 38 | 7 | 10 |
| Surface roughness of model object in layering height direction (μm) | 27 | 10 | 25 | 41 | 12 | 19 |

INDUSTRIAL APPLICABILITY

In 3-dimensional modeling, we provide a method of manufacturing a model object with a small surface roughness in the X and Y directions in the plane direction in which the resin granular material is layered, and a small surface roughness in the Z direction which is the height direction in which the resin granular material is layered. Further, since the model object obtained by such a manufacturing method is excellent in adherence between model objects, it can be suitably used for the manufacture of precision parts and the manufacture of a 3-dimensional model objects in which a load is applied to the joined portion.

The invention claimed is:

1. A method of manufacturing a 3-dimensional model object by a powder bed fusion method with a resin granular material, wherein the resin granular material comprises a resin powder (A) and a flow aid (B), a sphericity of the resin powder (A) is 90 or more and 100 or less, the resin powder (A) has a D80 particle size of 55 μm or less, a D20 particle size of 1 μm or more and a D50 particle size of 1 μm or more and 40 μm or less, a BET specific surface area of the resin powder (A) is $5 m^2/g$ or less, a ratio of the BET specific surface area of the resin powder (A) to a theoretical specific surface area calculated from the D50 particle size is 5 or less, the flow aid (B) is contained at an amount of more than 0.01 part by mass and less than 5 parts by mass with respect to 100 parts by mass of the resin powder (A), and steps (a) to (c) are repeatedly performed in this order:
   (a) a stage of a vessel for forming the 3-dimensional model object is lowered by an amount in a range of 0.01 mm or more and less than 0.10 mm,
   (b) the resin granular material is supplied to the vessel for forming the 3-dimensional model object to layer the resin granular material, and
   (c) a thermal energy is imparted to the resin granular material layered at a layering height of 0.01 mm or more and less than 0.10 mm to selectively melt and sinter the resin granular material.

2. The method according to claim 1, wherein the thermal energy is a laser energy, and the laser energy is $0.2 J/cm^2$ or more and less than $2.0 J/cm^2$ per unit area imparted to the resin granular material.

3. The method according to claim 1, wherein a surface roughness of a 3-dimensional model object to be obtained in a plane direction in which the resin granular material is layered is 20 μm or less, and a surface roughness of the model object in a height direction in which the resin granular material is layered is 20 μm or less.

4. The method according to claim 1, wherein the stage of the vessel for forming the 3-dimensional model object is lowered by an amount in a range less than 0.06 mm.

5. The method of manufacturing a 3-dimensional model object according to claim 1, wherein the polymer constituting the resin powder (A) is polyethylene, polypropylene, polyester, polyamide, polyphenylene sulfide, polyetherimide, polyamideimide, polyethersulfone, polytetrafluoroethylene, or a mixture thereof.

6. The method according to claim 1, wherein the resin granular material contains 10 parts by mass or more and 200 parts by mass or less of an inorganic reinforcing material (C) with respect to 100 parts by mass of the resin powder (A).

7. The method according to claim 6, wherein the inorganic reinforcing material (C) comprises glass fibers or carbon fibers.

8. A method of manufacturing a 3-dimensional model object by a powder bed fusion method with a resin granular material, wherein after performing a step for producing the resin granular material by dry blending a flow aid (B) at an amount of more than 0.01 part by mass and less than 5 parts by mass with respect to 100 parts by mass of a resin powder (A) having a sphericity of 90 or more and 100 or less, a D80 particle size of 55 μm or less, a D20 particle size of 1 μm or more, a D50 particle size of 1 μm or more and 40 μm or less, a BET specific surface area of $5 m^2/g$ or less, and a ratio of the BET specific surface area of the resin powder (A) to a theoretical specific surface area calculated from the D50 particle size is 5 or less, steps (a) to (c) are repeatedly performed in this order:
   (a) a stage of a vessel for forming the 3-dimensional model object is lowered by an amount in a range of 0.01 mm or more and less than 0.10 mm,
   (b) the resin granular material is supplied to the vessel for forming the 3-dimensional model object to layer the resin granular material,
   (c) a thermal energy is imparted to the resin granular material layered at a layering height of 0.01 mm or more and less than 0.10 mm to selectively melt and sinter the resin granular material, and
   (d) forming a 3-dimensional model object which has a surface roughness of 20 μm or less in a height direction in which the resin granular material is layered.

9. The method for manufacturing a 3-dimensional model object according to claim 8, wherein the polymer constituting the resin powder (A) is polyethylene, polypropylene, polyester, polyamide, polyphenylene sulfide, polyetherimide, polyamideimide, polyethersulfone, polytetrafluoroethylene, or a mixture thereof.

* * * * *